United States Patent [19]

Nessel

[11] 4,247,809
[45] Jan. 27, 1981

[54] ELECTRICAL LEVELLING SYSTEM FOR LASER BEAM

[75] Inventor: Jiri M. Nessel, Palo Alto, Calif.

[73] Assignee: AGL Corporation, Jacksonville, Ark.

[21] Appl. No.: 5,906

[22] Filed: Jan. 23, 1979

[51] Int. Cl.³ .............................................. G05B 11/01
[52] U.S. Cl. ..................................... 318/630; 318/648;
318/649; 318/663; 356/399
[58] Field of Search ............... 318/630, 648, 649, 663;
356/399; 33/291, 292, 295

[56] References Cited

U.S. PATENT DOCUMENTS

| | | | |
|---|---|---|---|
| 2,490,628 | 12/1949 | Isserstedt | 318/649 |
| 4,035,084 | 7/1977 | Ramsay | 318/648 |

*Primary Examiner*—Gene Z. Rubinson
*Assistant Examiner*—Eugene S. Indyk
*Attorney, Agent, or Firm*—Richards, Harris & Medlock

[57] ABSTRACT

A laser generating tube and associated optical system is mounted on a laser support which is mounted to pivot relative to a cradle about a first axis. The cradle is mounted to pivot about a second axis (transverse to the first) relative to a frame. First and second levelling motors control the angle of the support relative to the cradle and of the cradle relative to the frame. Thus the slope of the laser beam emitted from the optical system is controlled in two planes. Fixed to the laser support is a grade control device consisting of a base and a grade plate which is tripod mounted relative to the base, two of the three support points being on screws which are driven by first and second grade motors so that the slope of the grade plate relative to the base (and then to the laser support) may be adjusted in two planes. First and second potentiometers are arranged to adjust as the screws are turned. Fixed to the grade plate are two level-sensitive transducer vials which are parallel to the first and second axes and give out an electrical signal proportional to slope. Switches, manually or otherwise controlled, are set at the desired slopes and through the potentiometers servo-control the grade motors to adjust the grade plate (and thus the vials) relative to the base. The vials then servo-control the levelling motors until the vials are horizontal and thus the laser and optical system are at the slope set by the switches.

12 Claims, 18 Drawing Figures

ELECTRICAL LEVELLING SYSTEM FOR LASER BEAM

This invention relates to a new and improved electrical levelling system for laser beam. More particularly the invention relates to means for setting the grade and slope of a beam about one or both of two axes. Such a device is useful in surveying, particularly using a rotating laser beam for land levelling or sloping in manners well understood in the surveying art.

A principle feature of the present invention is a kinematic arrangement for controlling slope wherein the slope control is supported at three points and one or two of the points may be adjusted in elevation.

A feature of the invention is the provision of a first levelling system which contains two electronic levelling vials mounted on a frame, the frame being adjustable about two transverse axes relative to a base. One or more switches, which may be manually adjustable, may be set at a desired grade and/or slope. Means is provided for adjusting the vial support frame relative to a base at the proper angles for the selected grade and slope. A second electrical system, which includes the vials, adjusts the grade and slope of a second support on which a laser tube is mounted so that the second support is precisely parallel to the first mentioned base.

It is a function of the electronic vials to give out a signal proportional to the slope of the vials relative to the horizontal. Vial motors controlled by switches tilt the frame on which the vials are mounted relative to the base of the slope control. In the preferred embodiment shown the motors which tilt the vial support also drive voltage dividers and thereby a bridge circuit is energized so that the slope and grade of the vial matches the setting of switches which are matched to the voltage divider. Once the subframe has been adjusted relative to the slope control base, the vials control one or more servomotors which control the laser tube inclination so that the vials are horizontal, which also means that the tube is parallel to the slope control base.

The laser beam is mounted on a support, which is in a gimbal arrangement tilted about the two axes by motors which are in circuit with the vials to null signals of the vials.

A feature of the invention is a fact that the vials are mounted on a single plate which is supported from the slope control base by one stationary and two moveable points. The vial plate is tensioned relative to the slope base by a tensioning screw.

Another feature of the invention is the fact that one of the screws heretofore mentioned is mounted in a bushing having a differential screw thread which controls binding of the screw and eliminates backlash, thereby contributing to accuracy.

Other objects of the present invention will become apparent upon reading the following specification and referring to the accompanying drawings in which similar characters of reference represent corresponding parts in each of the several views.

Figures 1, 2, 3:
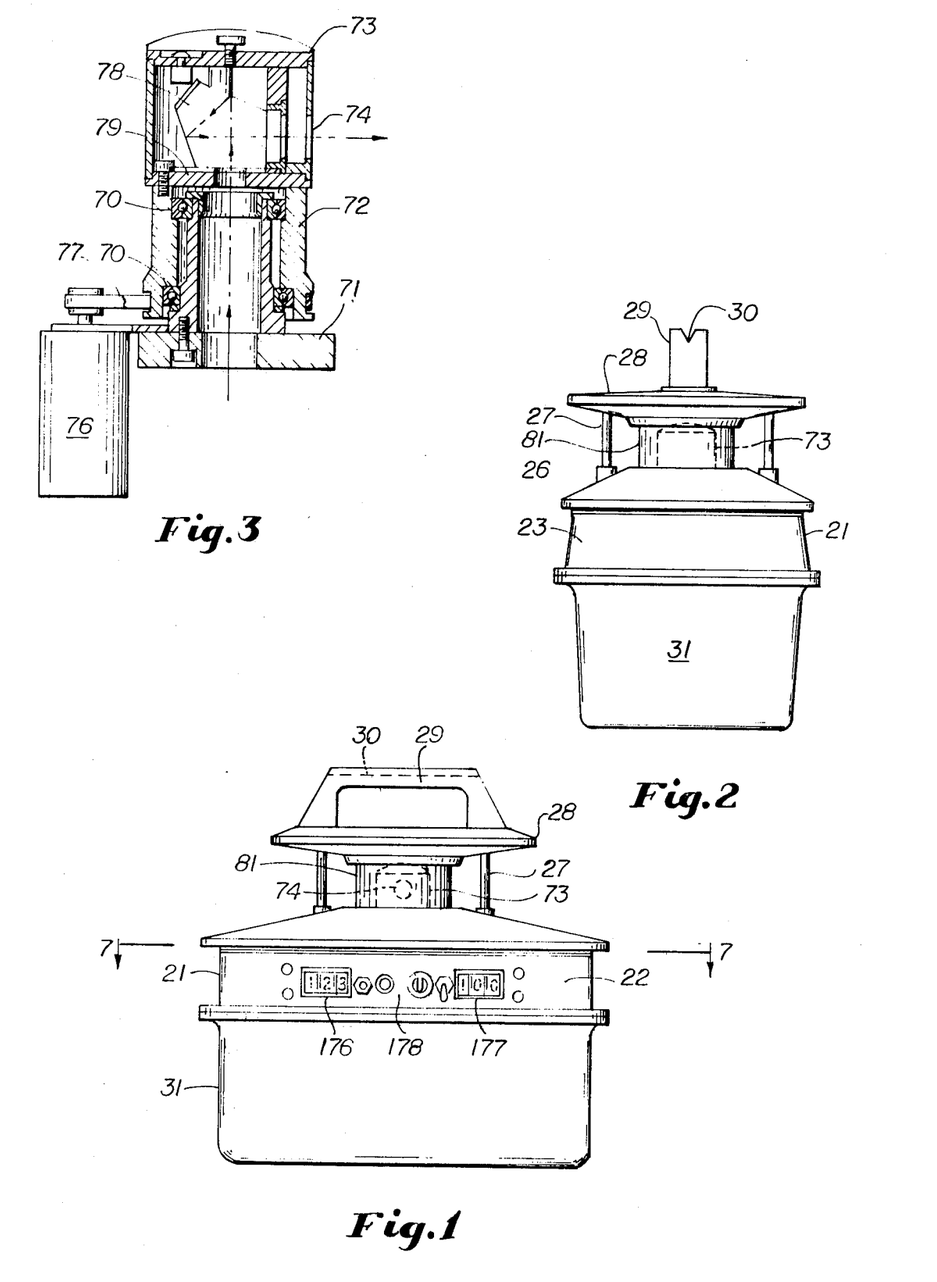
FIG. 1 is a side elevational view of the exterior of the instrument.
FIG. 2 is an end elevation thereof.
FIG. 3 is an enlarged sectional view of the turret which sweeps the laser beam.

The instrument is mounted on a central frame portion 21 which in plan view has elongated sides 22 and ends 23, ends 23 having inwardly disposed central bosses 24. Upwardly-inwardly slanted top cover 26 is mounted on top of central frame portion 21. Spacers 27 support top plate 28 above top cover 26. On top plate 28 is a handle 29 which may be formed with a V-shaped rifle sight 30. Below central frame portion 21 is a bottom cover 31 which encloses the bottom of the instrument.

Mounted inside central frame portion 21 is cradle 36 which is a horizontally disposed member having longitudinal sides 37 and ends 38 and is substantially open at top and bottom. Major axis pivots 41 pivot bosses 24 of ends 23 of central frame portion 21 to the ends 38 of cradle 36. The sides 37 of cradle 36 carry minor axis pivots 42 disposed at right angles to pivots 41. Inside cradle 36, supported thereby and depending therefrom, is tube support 46 which has a base 47 and upstanding yoke members 48 on either side which are pivoted to cradle 36 by pivots 42. Thus, the support 46 may slope relative to cradle 36 about the axis of minor axis pivots 42 and, in turn, as the cradle 36 pivots may pivot relative to frame portion 21 about the major axis through pivots 41. Hereinafter in this specification the means whereby pivoting is accomplished is explained in detail.

Figure 4:
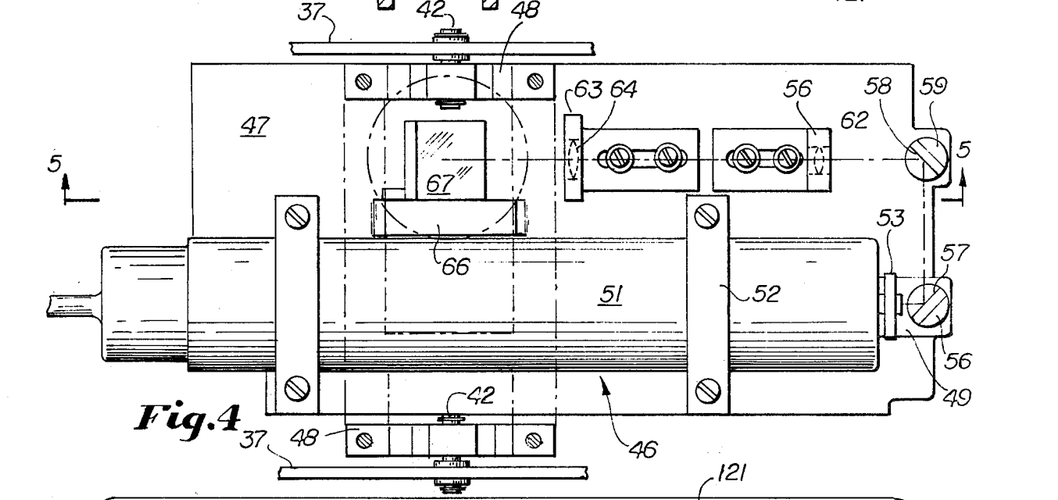
FIG. 4 is a top plan view of the optical system of the laser.
Figure 5:
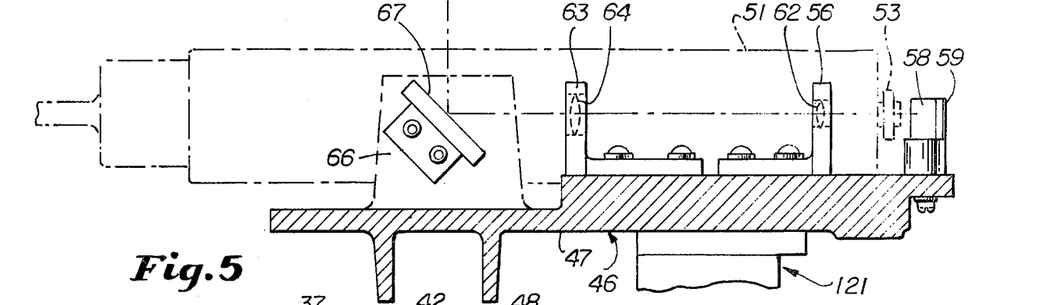
FIG. 5 is a sectional view taken substantially along the line 5—5 of FIG. 4.
Figure 6:
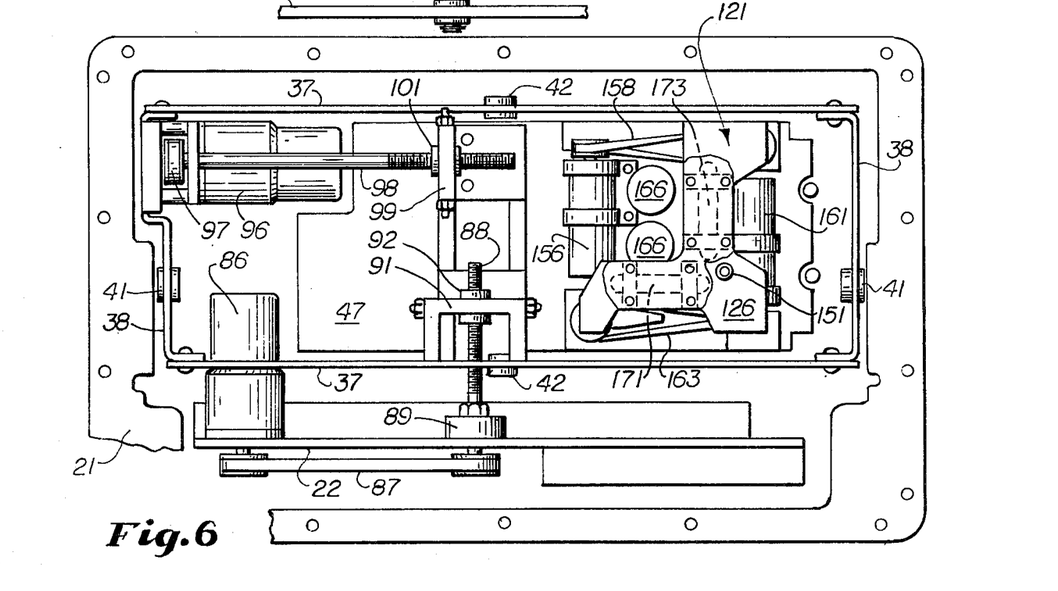
FIG. 6 is a bottom plan view of the structure of FIG. 4.
Figure 7:
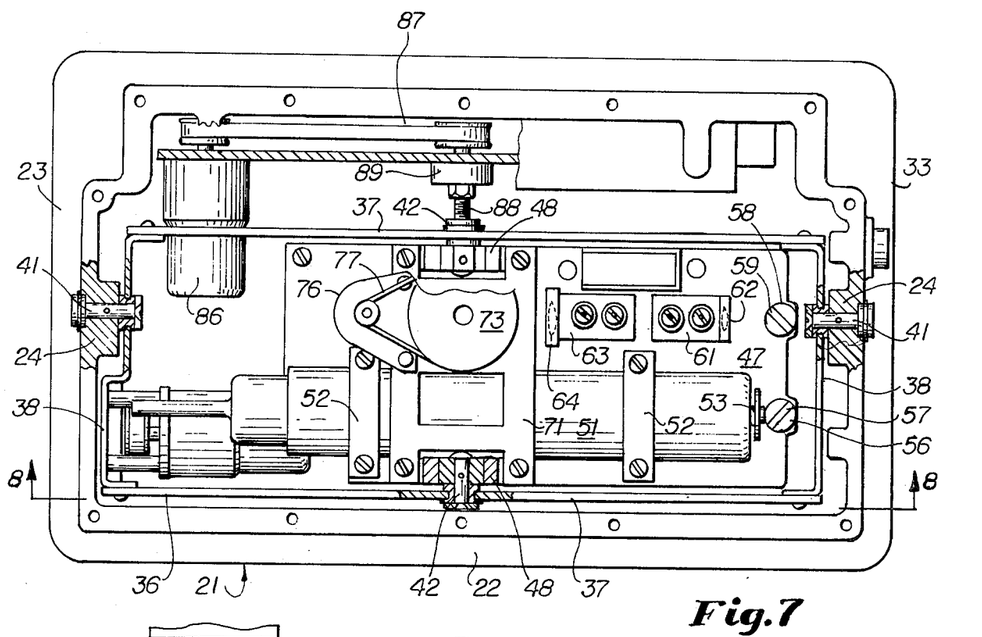
FIG. 7 is a view similar to FIG. 4 taken along the line 7—7 of FIG. 1.
Figures 8, 18:
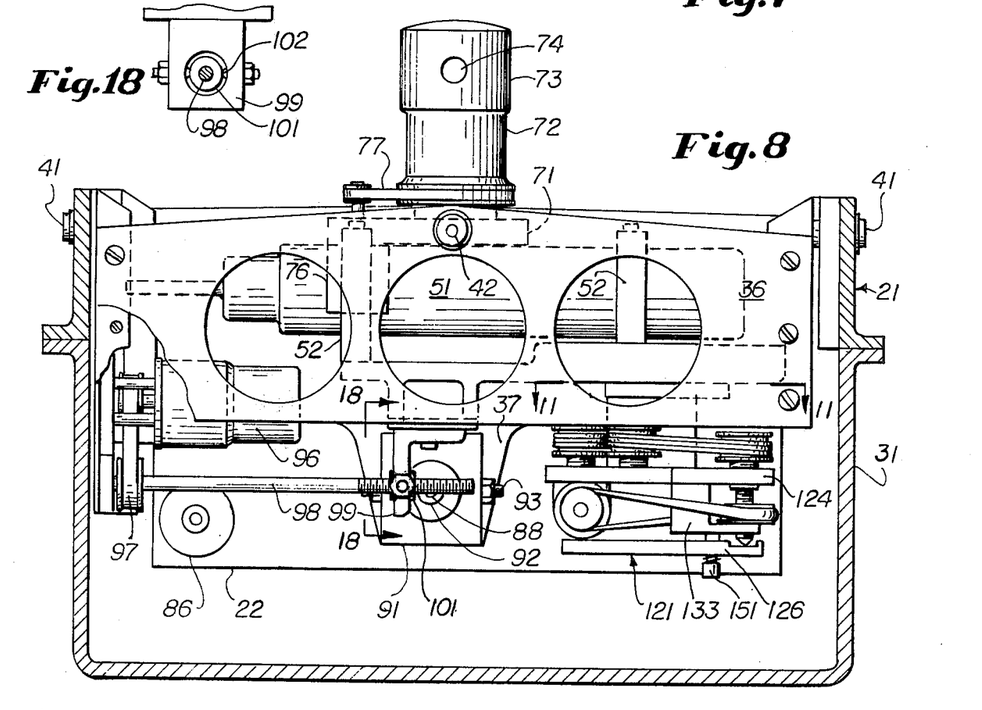
FIG. 8 is a sectional view taken substantially along the line 8—8 of FIG. 7.
FIG. 18 is a fragmentary sectional view taken substantially about line 18—18 of FIG. 8.
Figure 9:
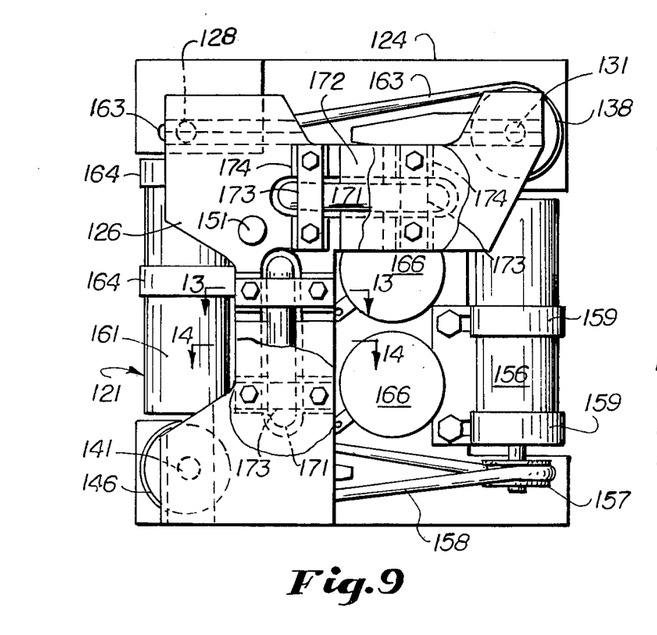
FIG. 9 is an enlarged bottom plan view of the grade device.
Figure 10:
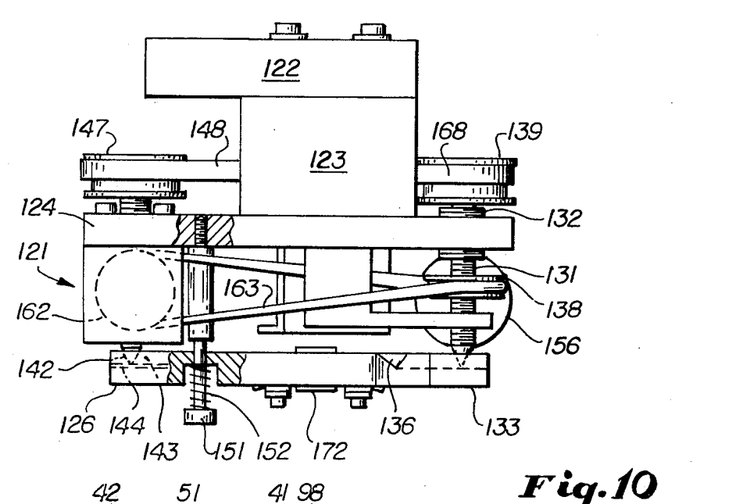
FIG. 10 is a side elevational view of the structure of FIG. 9, partially broken away to reveal internal construction.
Figures 11, 12, 13, 14, 15:
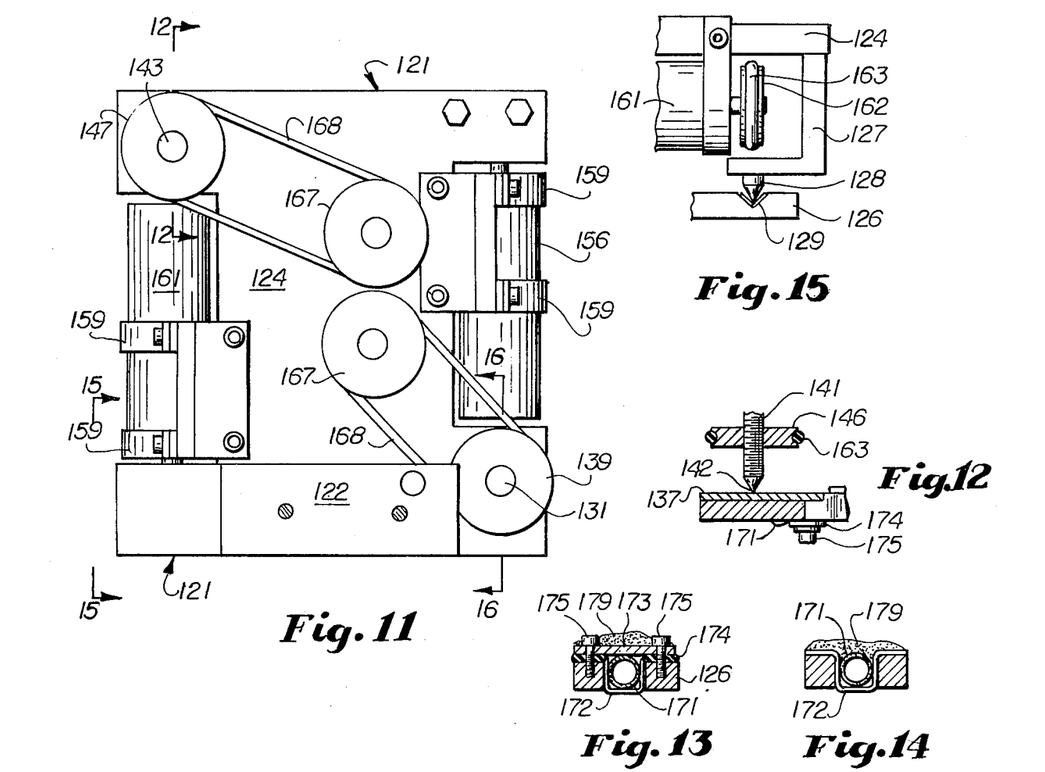
FIG. 11 is a sectional view taken along the line 11—11 of FIG. 8.
FIGS. 12-16, inclusive, are sectional views taken substantially along corresponding section lines in FIGS. 9 and 11.
Figure 16:
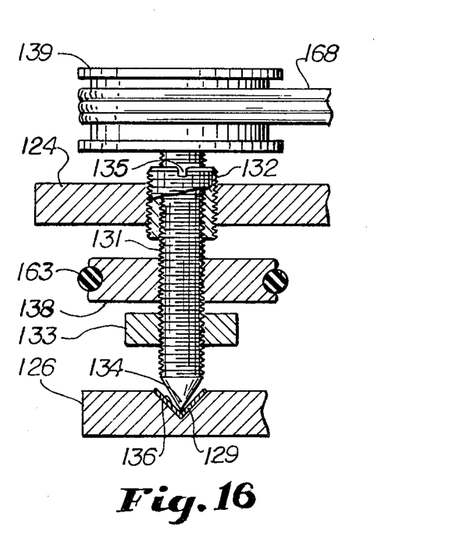

Tube support base 47 carries an upwardly concave seat 49 in which rests a laser tube 51 held on seat 49 by clamps 52. The details of laser tube 51 and its electrical support system are not described in detail herein, being well known in the laser surveying instrument art. Tube 51 has an emission aperture 53 at the right-hand end as veiwed in FIGS. 4 and 7. The principal function of the apparatus herein described is to direct the laser beam emitted through aperture 53 at a proper slope for surveying or other purposes. For such end use, an optical system is illustrated and described, it being understood that the optical system is merely a presently preferred embodiment and is subject to considerable variation depending upon the performance requirement of the surveying instrument.

In the optical system illustrated, a first mirror support 56 is attached to tube support 46 and adjustably supports a mirror 57 disposed at a 45° angle relative to the axis of tube 51. A second mirror support 58 is fixed to tube support 46 inwardly of support 56 and carries a second mirror 59 at a 45° angle to the axis of pivots 41.

It is an important feature of the optical system that the reflection of the laser beam reflected by mirror 59 is on the major axis of the instrument, namely, the axis of pivots 41. First lens support 61 is fixed to tube support 46 and carries a first lens 62. Inwardly of support 61 is second lens support 63 which carries a second lens 64. Mounted on the minor axis of the instrument, namely, the axis of pivots 42 is third mirror 67 attached to tube support 46 by third mirror support 66. Mirror 67 directs the laser beam directly upwardly at the coincidence of the major and minor axes of pivots 41 and 42, respectively.

Turret base 71 is fixed to a suitable upward projection of tube support 46 and has an upwardly extending cylindrical portion on which by means of bearings 70 is mounted rotatable turret 72. Turret 72 carries a head 72 on its upper end formed with an aperture 74. Turret motor 76 fixed to turret base 71 through pulleys and belt 77 drives turret 72. Prism 78 is mounted on prism mounting 79 attached to the top of turret 72. In the preferred embodiment shown, the prism 78 is a penta-prism of a type well known in this art which directs the vertical laser beam reflected from mirror 67 outwardly at right angles through the aperture 74. The use of such laser beams in surveying is presently well known. Interposed between top cover 26 and top plate 28 and surrounding head 73 is a window 81 which closes off the upper end of top cover 76 and protects the rotating turret and its contents from damage. It will be understood that, as hereinafter described, the turret head 73 may tilt relative to a vertical axis (i.e. relative to frame members 21, 26, 31) but by reason of the extended vertical height of window 81 interference with the emission of the laser beam does not occur.

To tilt cradle 36 relative to central frame portion 21 about major axis pivots 41, major axis motor 86 is fixed to side 22 of frame portion 21 of the sides 37 of cradle 36. By means of belt 87, motor 86 turns screw 88 which is rotatably supported by bearing 89 fixed to the inside of side 22. Nut holder 91 is fixed to cradle 36. Nut 92 located within an aperture in nut holder 19 is in threaded engagement with screw 88. Nut 92 may pivot about a horizontal axis by reason of the fact that it is supported from holder 91 by pivots 93 which have horizontal axes and engage the exterior of nut 92. Thus as the screw 88 is turned, the nut holder 91 is moved inward and outward relative to central frame portion side 22 causing the cradle 36 to pivot around pivots 41.

Minor axis motor 96 is fixed to cradle end 37. By means of belt 97 it drives screw 98. Nut holder 99 is fixed to tube support base 47 and is apertured, and within the aperture is nut 101 attached to holder 99 by horizontal pivots 102. Thus motor 96 causes support 46 to pivot relative to cradle 36 about minor axis pivots 42.

Fixed to and depending below tube support base 47 is a grade device 121. On the top of grade device 121 is a bridge 122 which is bolted to the underside of base 47. Base plate 124 parallel to base 47 is spaced below the latter by vertical spacer 123. Supported below plate 124 by a tripod arrangement hereinafter described and capable of sloping relative thereto is grade plate 126. One of the features of the invention is the means whereby plate 126 may be caused to slope relative to base plate 124 about two axes for a purpose hereinafter set forth.

One of the mountings of plate 126 consists of a pivot mounting 127 on plate 124 having a fixed pivot 128 which fits against a shim 129 in a V-shaped slot in the upper surface of plate 126. Pivot 128 is at one of the three corners of plate 126. At one of the other corners is major axis screw 131 which is in threaded engagement with differential nut 132 which is threaded into a hole in plate 124. The numbers of threads on screw 131 and on the exterior of nut 132 are different. Fixed to plate 124 and depending below nut 132 is threaded guide 133 which screw 131 engages. By turning nut 132 relative to plate 124 by means of slot 135, and by reason of the differential threads heretofore mentioned, there is a pre-loading of screw 131 which eliminates backlash. The lower end of screw 131 has a point 134 which fits into a V-shaped slot 136 in plate 126. Preferably hardened shims 137 align the slot 136. Fixed on screw 131 intermediate plate 124 and guide 133 is pulley 138. Screw 131 extends up through plate 124 and carries pulley 139 on its upper end.

At a third corner of plate 126 is minor axis screw 141 which is guided and supported in a manner similar to screw 131 relative to base plate 124. The point 142 of screw 141 fits into a V-shaped slot 143 in plate 126 and is provided with shims 144. Screw 141 carries pulley 146 between plates 124 and 126 and also carries pulley 147 above plate 124.

It will be understood that the pivot points 128, 134 and 142 determine the slopes of plate 126 relative to plate 124 depending upon turning of screws 131 and 141. To maintain plate 126 in contact with the pivots, a grade plate screw 151 is threaded into plate 124 and extends down through a hole in plate 126. Spring 152 is interposed within a counterbore on the bottom surface of plate 126 between the head of screw 151 and the bottom of the counterbore. The function of spring 152 is to bias plate 126 upwardly and thus maintain engagement of the points of the pivots with the appropriate grooves in the plate 126.

Tilting of plate 126 relative to plate 124 about the major axis is controlled by major axis motor 156 having a sprocket pulley 157 connected by sprocket belt 158 to pulley 146 which controls screw 141. Motor 156 is attached to plate 124 by clamps 159. Similarly, minor axis motor 161 which carries a sprocket pulley 162 is connected by sprocket belt 163 to pulley 138 which controls screw 131.

Attached to plate 124 are two potentiometers 166, the sliders (not shown) of which are controlled in position by means of pulleys 167. Belts 168 connect the pulleys 167 of the potentiometers to pulleys 139 and 147. Hence as the screws 131 and 141 are turned, one or the other of the potentiometers 166 is correspondingly adjusted. Other means, e.g. stepmotors, may be used in place of the potentiometers.

Fixed in apertures in plate 126 are two vials 171. Vials 171 contain an electrolyte and an air bubble and three electrodes. Such devices, which are termed transducers in this specification, are commercially available, one suitable transducer being the 7630 series of the Fredricks Company of Huntingdon Valley, Pa. It is a function of such transducers that when connected in a suitable AC excited bridge circuit, an electrical output proportional to the angular deviation from the level position is obtained. Hence, as the vials 171 tilt about the two axes of the device, their electrical output (voltage) varies. Each vial 171 is supported within the aperture in plate 126 in a resilient but firm manner. Thus a yoke-shaped clip 172 of spring metal fits over the top of vial 171, the ends of the yoke being supported by the underside of plate 126. The vial 171 is held up by two transverse clips 173 which bear against resilient pads 174 interposed between the clip 173 and plate 126. Four screws 175 fit through oversize holes in clips 173 and through pads 174 and are threaded into plate 126. Very accurate adjustment of the position of vial 171 relative to plate 126 (i.e. precise parallelism) is accomplished by tightening and/or loosening screws 175. When the parts are finally adjusted, plaster of paris 179 or other substance may be allowed to harden over the parts to prevent future unintentional change in position.

First and second thumbwheel switches 176, 177 are mounted on panel 177 on one of the sides 22 of central brain portion 121. The switches 176 and 177 are manually adjusted by the operator to the desired slopes about the two axes of the instrument. It will be understood that other means for controlling the slope may be substituted for the switches 176, 177. By means of an amplifier, the motors 156, 161 are driven in either direction until the potentiometers 166 give the proper feedback for the switch adjustment. Thereupon, plate 126 is fixed relative to plate 124 at the desired slopes. Such sloping of plate 126 slopes the vial 171. By means of a second circuit, the motors 86 and 96 are turned until both vials 171 are level. Hence the tube support base 47 is driven to the appropriate angles relative to the horizontal, and the beam emitted through aperture 74 sweeps in a plane at the desired slope.

Figure 17:
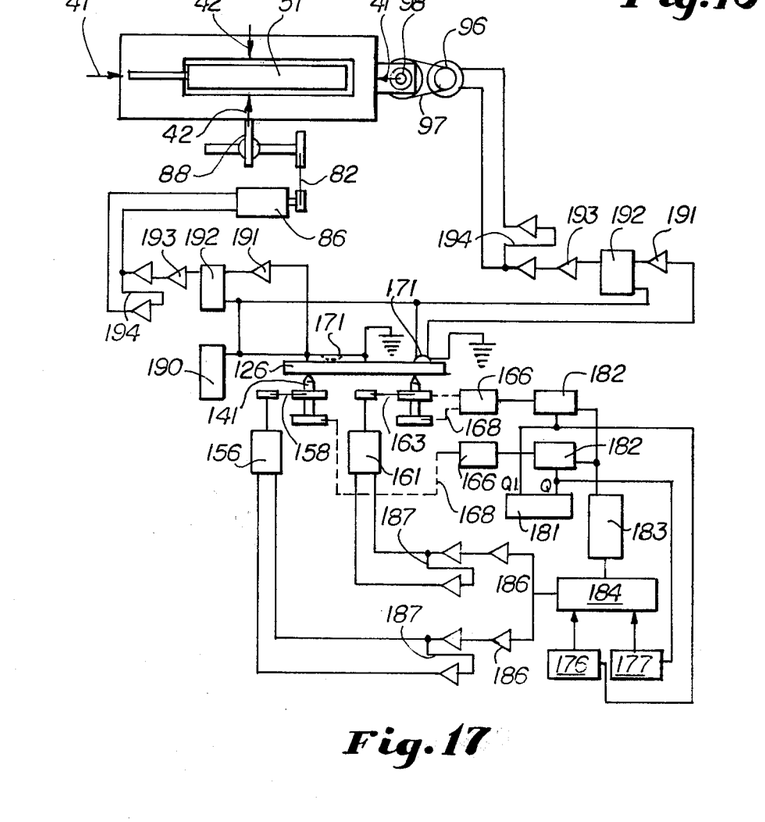
FIG. 17 is a schematic diagram of the electrical system.

Directing attention now to the schematic electrical diagram of FIG. 17, one presently preferred electromechanical system is illustrated. The operator sets thumb wheel switches 176 and 177 on the exterior of casing 121 at the desired grade and slope at which the operator wishes the beam of the laser to be emitted through window 74. Oscillator 181 periodically (e.g., every two seconds) emits a signal Q or Q to be emitted to energize either the switch 176 or the switch 177 which then emits a signal to the comparator 184. Simultaneously, the signal also emits the same signal to one of the analog switches 182 which are in electrical connection with one of the potentiometers 166, and the signals from the analog switches 182 are transmitted to the analog-digital convertor 183 and thence to the comparator 184. Depending upon the relative signals from the potentiometers 166 or the switch 176 or 177, compartor 184 emits a signal to one of the DC amplifiers 186. Connected to each amplifier 186 is a pair of motor drivers 187 which drive motor 156 or motor 161 in either direction. Depending upon the direction in which motor 156 or 161 is turned, screws 131 and 141 are turned to adjust the slope and grade of the grade plate 126. Thus the angles of plate 124 relative to plate 126 are adjusted in accordance with the settings of the switches 176 and 177.

Tilting of the plate 126 relative to the horizontal causes the vials 171 to tilt in either direction. Oscillator 190 emits a signal periodically which is transmitted to the two vials 171 and it is a characteristic of these vials that they emit a signal which is proportional to their tilting from the horizontal. The signal from each vial 171 is amplified by vial amplifier 191 and then fed to mixer 192 which is also energized by oscillator 190.

The signal from mixer 192 is amplified by DC amplifier 193 and then fed to the motor drivers 192 which are arranged to drive motor 86 or 96 in a direction depending upon the signal from the mixer 192. Motor 86 is connected by means heretofore explained to tilt the base 47 upon which the laser tube 51 is mounted about pivots 41. Motor 96 correspondingly tilts the base 47 about the pivots 42. The motors 86 and 96 continue to turn until the signals from the vials 171 are nulled. At this point, the base 47 is inclined in two planes relative to the horizontal in exact conformity to the settings of the thumb switches 176 and 177. Accordingly, through the optical system which has heretofore been explained, the laser beam is transmitted vertically into the turret 72 and is directed by the prism 78 out the aperture 74. As the turret 72 is turned by its motor 76, the emitted beam sweeps in a plane having a slope and grade relative to the horizontal which is determined by the settings of the screws 176 and 177.

What is claimed is:

1. A levelling system for positioning and maintaining a device at a predetermined slope from the horizontal in a first plane perpendicular to a first axis comprising:
    a frame;
    a support having said device thereon;
    first pivot means mounting said support in said frame for pivotal motion relative to said frame about at least a second axis parallel to said first axis;
    first drive means for adjusting the position of said support relative to said frame about said second axis;
    a first plate secured to said support and parallel to said device in said first plane;
    a second plate;
    second pivot means mounting said second plate on said first plate for pivotal motion relative to said first plate about at least a third axis parallel to said first axis;
    means sensing the slope of said second plate relative to said first plate in said first plane;
    second drive means for adjusting the position of said second plate relative to said first plate about said third axis;
    selector switch means being set to said predetermined slope;
    means comparing the slope set by said selector switch means and sensed by said sensing means and activating said second drive means to pivot said second plate to a slope relative to said first plate corresponding to said set slope, said means further maintaining said correspondence;
    at least one transducer mounted to said second plate, said transducer emitting a signal depending upon the slope of said second plate to the horizontal in said first plane;
    means activating said first drive means in response to said signal from said transducer to position the second plate horizontally in said first plane, said activating means maintaining said second plate horizontal in said first plane; and
    said device being positioned and maintained at said predetermined slope by the action of said comparing means and said activating means.

2. The system according to claim 1 in which said device is positioned and maintained at a predetermined slope from the horizontal and in which said first pivot means further mounts said support in said frame for pivotal motion relative to said frame about a fourth axis perpendicular to said first axis and to a second plane, said second pivot means further mounts said second plate on said first plate for pivotal motion relative to said first plate about a fifth axis parallel to said fourth axis, said selector switch means comprising first and second switch means, said first switch means being set to a first slope in said first plane and said second switch means being set to a second slope in said second plane, said first and second slopes in said first and second planes corresponding to said predetermined slope, said system further comprising:

third drive means for adjusting the position of said support relative to said frame about said fourth axis;

fourth drive means for adjusting the position of said second plate relative to said first plate about said fifth axis;

a second transducer mounted to said second plate, said first and second transducers emitting a signal depending upon the slope of said second plate to the horizontal;

said sensing means sensing the slope of said second plate relative to said first plate from the horizontal;

said comparing means comparing the slope set by said first and second switch means and sensed by said sensing means and activating said second drive means and said fourth drive means to pivot said second plate to a slope relative to said first plate corresponding to said predetermined slope, said means further maintaining said correspondence;

said activating means activating said first and said third drive means in response to said signal from said first and second transducers to position the second plate horizontal, said activating means maintaining said second plate horizontal; and said device being positioned and maintained at said predetermined slope from the horizontal.

3. A leveling system for positioning and maintaining a device in a surveying instrument at a predetermined slope from the horizontal in a first plane perpendicular to a first axis comprising:

a frame;

a support having said device thereon;

first pivot means mounting said support in said frame for pivotal motion relative to said frame about a second axis parallel to said first axis;

first support drive means for adjusting the position of said support relative to said frame about said second axis;

a first plate secured to said support and parallel said device in said first plane;

a second plate;

second pivot means for mounting said second plate on said first plate for pivotal motion relative to said first plate about a third axis parallel to said first axis;

means sensing the slope of said second plate relative to said first plane;

first plate drive means for adjusting the position of said second plate relative to said first plate about said third axis;

selector switch means being set to said predetermined slope;

means comparing the slope set by said selector switch means and sensed by said sensing means and activating said first plate drive means to pivot said second plate to a slope relative to said first plate corresponding to said set slope, said means further maintaining said correspondence;

at least one vial transducer mounted to said second plate, said vial transducer emitting a signal dependent upon the slope of said second plate to the horizontal in said first plane;

means activating said first drive means in response to said signal from said transducer to null the signal and position the second plate horizontal in said first plane, said means maintaining said second plate horizontal in said first plane; and said device being positioned and maintained at said predetermined slope by the action of said comparing means and said activating means.

4. The system of claim 3 in which said second pivot means further mounts said second plate on said first plate for pivotal motion relative to said first plate about a fourth axis perpendicular to said first axis and a second plane, and said selector switch means comprising first and second switch means, said first switch means being set to a first slope in said first plane and said second switch means being set to a second slope in said second plane, said first and second slopes in said first and second planes corresponding to said predetermined slope, said first pivot means comprising a cradle, a first pivot mounting said cradle in said frame for pivotal motion relative to said frame about a fifth axis perpendicular to said fourth axis and a second pivot mounting said support in said cradle for pivotal motion relative to said cradle about said second axis, said system further comprising:

second support drive means for adjusting the position of said cradle relative to said frame about said fifth axis;

second plate drive means for adjusting the position of said second plate relative to said first plate about said fourth axis;

a second vial transducer mounted to said second plate, said first and second transducers emitting a signal depending upon the slope of said second plate to the horizontal;

said sensing means sensing the slope of said second plate relative to said first plate in said first and second planes;

said comparing means comparing the slope set by said first and second switch means and sensed by said sensing means and activating said first and second plate drive means to pivot said second plate to a slope relative to said first plate corresponding to said predetermined slope, said means further maintaining said correspondence;

said activating means activating said first and second support drive means in response to said signal from said first and second transducer to position the second plate horizontal, said activating means maintaining said second plate horizontal; and said device being positioned and maintained at said predetermined slope.

5. A control according to claim 1 in which said second pivot means comprises three pointed members disposed in tripod arrangement and carried by one said plate, the points of said members bearing against the other of said plates and means biasing said plates toward each other, at least a first said member being threaded into the plate by which it is carried, said second drive means turning said first member.

6. A system according to claim 5 which further comprises a sleeve having first threads on its interior and second threads on its exterior of different pitch than said first threads, said sleeve threaded into said plate and said first member threaded into said sleeve, said sleeve being rotatable relative to said plate, a guide fixed to said plate, said first member threaded into said guide, whereby upon adjusting said sleeve backlash of said first member may be reduced.

7. A system according to claim 5 in which said sensing means comprises a variable resistor turnable with said first member, said comparing means comprises a comparator, means for simultaneously supplying signals to said comparator from said selector switch means and said variable resistor, and said second drive means comprises a motor drive activated by said comparator and a reversible motor driving said first member controlled by said motor driver to turn said first member until the slope between said plates corresponds to the setting of said switch means.

8. A system according to claim 2 in which said second pivot means comprises three pointed members disposed in tripod arrangement and carried by one said plate, the points of said members bearing against the other of said plates and means biasing said plates toward each other, a first said member being threaded into the plate by which it is carried, said second drive means turning said first member and said fourth drive means turning a second of said pointed members, said second pointed member being threaded into the plate in which it is mounted.

9. A system according to claim 3 wherein said device is a a laser tube for emitting a beam which further comprises a turret having an aperture, means for rotating said turret, and an optical system for directing the beam of said laser tube upward and outward through said aperture to sweep said beam in a plane perpendicular to said first plane.

10. A system according to claim 9 in which said first pivot means comprises a cradle, means for pivotally mounting said cradle in said frame about a fourth axis perpendicular to and intersecting said second axis, the axis of rotation of said turret being perpendicular to and intersecting both said second and said fourth axes, and second support drive means for adjusting said cradle relative to said frame about said fourth axis, and in which said activating means activates said second support drive means.

11. A system according to claim 4 in which said second pivot means comprises a first and second rotatable pointed member carried by one said plate and which further comprises a fixed third pointed member carried by said one plate, the points of said members bearing against the other of said plates in a tripod arrangement and means biasing said plates toward each other, said first and second members being threaded into the plate by which it is carried, said first and second plate drive means turning said first and second members, respectively.

12. A system according to claim 3 in which said first support drive means comprises a reversible motor mounted on said frame, a lead screw rotatably mounted in said frame about an axis transverse to said first axis, a nut in threaded engagement with said lead screw, means connected to said support mounting said nut for pivotal movement about an axis perpendicular to said lead screw.

* * * * *

UNITED STATES PATENT AND TRADEMARK OFFICE
CERTIFICATE OF CORRECTION

PATENT NO. : 4,247,809
DATED : January 27, 1981
INVENTOR(S) : Jiri M. Nessel

It is certified that error appears in the above-identified patent and that said Letters Patent are hereby corrected as shown below:

Col. 3, line 16, "head 72" should be --head 73--;
       line 41, "19" should be --91--.
Col. 5, line 34, "signal Q" should be --signal $\overline{Q}$--;
       line 62, "drivers 192" should be --drivers 194--.
Col. 9, line 5, "drive" should be --driver--.

Signed and Sealed this

Fifth Day of May 1981

[SEAL]

Attest:

RENE D. TEGTMEYER

*Attesting Officer*     *Acting Commissioner of Patents and Trademarks*